(12) United States Patent
Berg et al.

(10) Patent No.: US 9,054,785 B2
(45) Date of Patent: Jun. 9, 2015

(54) METHOD AND ARRANGEMENT IN A TELECOMMUNICATION SYSTEM FOR ESTIMATING FREQUENCY DEPENDENT RESISTANCE

(75) Inventors: Miguel Berg, Upplands Väsby (SE); Daniel Cederholm, Solna (SE); Per Ola Börjesson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 509 days.

(21) Appl. No.: 13/504,261

(22) PCT Filed: Dec. 22, 2009

(86) PCT No.: PCT/EP2009/067733
§ 371 (c)(1),
(2), (4) Date: Apr. 26, 2012

(87) PCT Pub. No.: WO2011/050863
PCT Pub. Date: May 5, 2011

(65) Prior Publication Data
US 2012/0221271 A1    Aug. 30, 2012

Related U.S. Application Data

(60) Provisional application No. 61/256,415, filed on Oct. 30, 2009.

(51) Int. Cl.
*G06F 19/00* (2011.01)
*G01R 27/00* (2006.01)
*G01R 27/04* (2006.01)
*H04B 3/48* (2006.01)

(52) U.S. Cl.
CPC .................................... *H04B 3/48* (2013.01)

(58) Field of Classification Search
CPC ........ G01R 31/024; G01R 31/11; H04B 3/46; H04B 3/48; H04B 3/466; H04M 3/306; H04M 3/26
USPC .................... 702/57, 65, 75; 324/520; 703/2; 379/27.01
See application file for complete search history.

(56) References Cited

U.S. PATENT DOCUMENTS

| | | | |
|---|---|---|---|
| 6,177,801 B1 * | 1/2001 | Chong | 324/520 |
| 6,417,672 B1 * | 7/2002 | Chong | 324/520 |
| 8,065,100 B2 * | 11/2011 | Lindqvist et al. | 702/65 |
| 8,265,232 B2 * | 9/2012 | Lindqvist | 379/27.01 |

* cited by examiner

*Primary Examiner* — John H Le

(57) ABSTRACT

Method and arrangement in a telecommunication system for estimating frequency dependent resistance of a transmission line. Insertion loss per length unit of the transmission line at a first frequency is determined. Thereupon a first resistance per length unit based on the determined insertion loss per length unit of the transmission line is calculated. Effective resistance per length unit at a second frequency based on the calculated first resistance is calculated. The calculated effective resistance could be used when estimating the insertion loss for the second frequency and all frequencies of interest.

36 Claims, 8 Drawing Sheets

| Wire diameter (mm) | 300 kHz data | | 1 MHz data | |
|---|---|---|---|---|
| | IL (dB/km) | $C_2$ | IL (dB/km) | $C_2$ |
| 0.32 | 17.3 | $5.1 \cdot 10^{-3}$ | 30.6 | $4.9 \cdot 10^{-3}$ |
| 0.40 | 14.2 | $5.2 \cdot 10^{-3}$ | 24.7 | $4.9 \cdot 10^{-3}$ |
| 0.50 | 10.7 | $4.9 \cdot 10^{-3}$ | 19.6 | $4.9 \cdot 10^{-3}$ |
| 0.63 | 8.4 | $4.9 \cdot 10^{-3}$ | 16.2 | $5.1 \cdot 10^{-3}$ |
| 0.90 | 6.2 | $5.1 \cdot 10^{-3}$ | 11.6 | $5.2 \cdot 10^{-3}$ |

METHOD AND ARRANGEMENT IN A TELECOMMUNICATION SYSTEM FOR ESTIMATING FREQUENCY DEPENDENT RESISTANCE

This application claims the benefit of U.S. Provisional Application No. 61/256,415, filed Oct. 30, 2009, the disclosure of which is fully incorporated herein by reference.

FIELD OF THE INVENTION

The present invention relates to a method and arrangement in a telecommunication system, in particular to methods and arrangements for estimating frequency dependent resistance of a telecommunication transmission line.

BACKGROUND

Single-Ended Line Test (SELT) or Double-Ended Line Test (DELT) (known as Loop Diagnostics in some Digital Subscriber Line (DSL) standards), can be used to determine characteristics such as attenuation of a telecommunication transmission line. SELT is typically performed from a DSL Access Multiplexer (DSLAM) in the Central Office (CO). Together with knowledge about transmitter and noise power spectral densities (PSDs), an accurate estimate of attenuation can be used to determine line capacity. An advantage of using SELT to determine attenuation is that there is no need for installation of Customer Premises Equipment (CPE). Thus, it is usable as a tool for service pre-qualification. However, in order to determine line capacity accurately in e.g. a DSL system, attenuation per frequency must be known.

Another application where attenuation versus frequency is required is in order to perform so called Upstream Power Back Off (UPBO) for VDSL2. UPBO means that the CPEs adapt their transmitted signal so that the received power spectral density at the DSLAM is constant, independent of loop length. This requires a method to calculate the attenuation for all frequencies of interest, given only a limited amount of information. For UPBO, it is assumed that attenuation can be described sufficiently as a constant times the square root of frequency.

In certain applications, attenuation is measured or given at one or more frequencies but in order to determine line capacity it may be needed to know attenuation for other frequencies.

Several methods of determining attenuation per frequency are based either explicitly or implicitly on effective resistance per frequency. Prior art in the area of determining attenuation per frequency is based on the following approaches:
  Double-Ended Line Test Methods, e.g. Loop Diagnostics as mentioned previously where attenuation is determined by measurement at all frequencies of interest.
  Utilization of the fact that for sufficiently high frequencies, attenuation in cables with negligible dielectric losses can be described as a constant times the square root of frequency since effective resistance is proportional to the square root of frequency for these frequencies.
  Calibration of Time-Domain Reflectometry (TDR) far-end reflection magnitude against two or more reference cables with known properties and storing calibration vectors consisting of one attenuation value per frequency of interest.
  Successive Loop Topology identification, fitting a low-order cable model to each identified loop segment, followed by calculation of attenuation using the cascaded cable models. Such calculation of attenuation often involves calculation of effective resistance, based on two or more parameters.
  Calculation of insertion loss using knowledge of the cables, e.g. from operator's databases, together with suitable cable models for the cables in the databases. Such databases could include e.g. the type of cable and the length of each cable segment similar to the result of successive loop topology identification. The cable models could be similar to those used in loop topology identification.

For xDSL applications, the prior art of calculating attenuation versus frequency as a constant times the square root of frequency (e.g. as for UPBO) works reasonably well for frequencies above a couple of 100 kHz, (i.e. the majority of frequencies used in xDSL systems) but can be inaccurate for lower frequencies (e.g. ADSL upstream, VDSL2 upstream band zero (US0)) since effective resistance is not necessary proportional to the square root of frequency at those frequencies. According to the VDSL2 standard, usage of the previously mentioned UPBO mechanism for US0 is an item for further study. It is likely that a more accurate method to determine attenuation would be needed for that purpose.

The approach of calibrating the TDR far-end reflection magnitude requires calibration against two or more reference cables for all frequencies of interest. It also requires storing both the calibration coefficients and the resulting attenuation values for every frequency of interest.

The approach of Successive Loop Topology identification takes the loop topology into account, including effects of standing waves between cable segments with dissimilar impedance. However, this method requires access to the complex-valued input impedance of the loop for a number of frequencies. It also requires significant processing in order to reach the result.

The prior art of using cable models in order to calculate e.g. attenuation require four or more parameters to describe a cable segment apart from the segment length. At least two individual parameters of the four or more parameters are used to describe the frequency dependent resistance i.e. the effective resistance. Typically this includes a DC resistance and a breakpoint frequency where the so called skin effect and the proximity effect become significant.

SUMMARY

Therefore the object of the present invention is to improve the estimation of frequency dependent resistance of a telecommunication transmission line.

The above stated object is achieved by means of a method and arrangement according to the independent claims.

In accordance with a first aspect of the present invention a method in a telecommunication system for estimating frequency dependent resistance of a transmission line is provided. The method comprises the step of determining insertion loss per length unit of the transmission line at a first frequency. In an additional step comprised in the method the calculating of a first resistance per length unit based on the determined insertion loss per length unit of the transmission line is performed. In a further step effective resistance per length unit at a second frequency based on the calculated first resistance is calculated.

In accordance with a second aspect of the present invention an arrangement in a telecommunication system configured to estimate frequency dependent resistance of a transmission line is provided. The arrangement comprises a determining unit configured to determine insertion loss per length unit of the transmission line at a first frequency. It further comprises a calculating unit configured to calculate a first resistance per length unit based on the determined insertion loss per length unit of the transmission line. Moreover, the arrangement comprises a calculating unit configured to calculate effective resistance per length unit at a second frequency based on the calculated first resistance.

An advantage of embodiments of the present invention is that they can be used to estimate effective resistance versus frequency from measurements on only one frequency and to estimate effective resistance versus frequency from information given in cable data sheets or similar sources. This means e.g. that a measurement with ADSL equipment can be used to estimate effective resistance for the whole VDSL2 frequency range.

Another advantage of embodiments of the present invention is that it can be used both to estimate insertion loss versus frequency from measurements on one frequency and to estimate insertion loss versus frequency from information given in cable data sheets or similar sources. This means e.g. that a measurement with ADSL equipment can be used to estimate insertion loss for the whole VDSL2 frequency range even if the measurement equipment does not support this.

Further advantages of embodiments of the present invention are that it provides compact and easily understandable representation of insertion loss per frequency using only a small set of parameters.

Yet another advantage of embodiments of the present invention is that it yields an estimate of the wire radius of the transmission line, which can be used to identify the cable type of the transmission line.

Other objects, advantages and novel features of the present invention will become apparent from the following detailed description of the invention when considered in conjunction with the accompanying drawings.

DETAILED DESCRIPTION

Figures 1, 2:
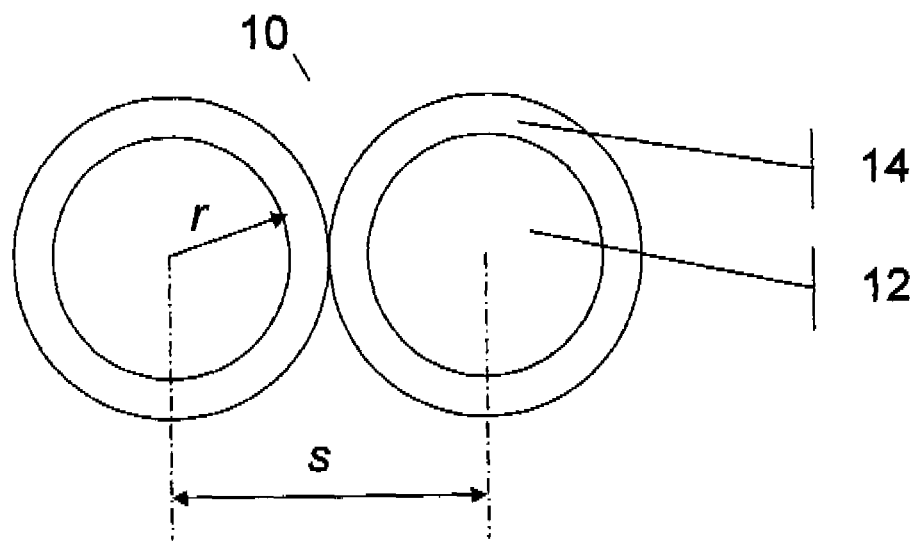
FIG. 1 illustrates the geometry of a wire pair.
FIG. 2 shows the results of the determination of the proportionality constant from equation (25) based on the ETSI cable models and insertion loss per km at 300 kHz and 1 MHz.

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practised in other embodiments that depart from these specific details. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The basic concept of the present invention is to estimate the frequency dependent resistance of a transmission line at a frequency based on only the insertion loss per length unit of the transmission line at a measured or given frequency. The insertion loss per length unit of the transmission line at a first frequency is determined. Thereupon a first resistance per length unit based on the determined insertion loss per length unit of the transmission line can be calculated. Based on the calculated first resistance, the effective resistance per length unit at a second frequency can be calculated. In the following description further details regarding the estimating of frequency dependent effective resistance used in the inventive method will be given.

In the following section of the detailed description the derivation of suitable formulas and approximations utilized in embodiments of the present invention is described.

The characteristic impedance $Z_c$ of a transmission line is the input impedance of an infinitely long section of the transmission line, i.e. when no reflections occur from the far end. The characteristic impedance $Z_c$ can be calculated from the frequency dependent series resistance R and inductance L combined with the shunt conductance G and capacitance C together with the angular frequency $\omega = 2\pi f$.

$$Z_C = \psi + j\zeta = \sqrt{\frac{R + j\omega L}{G + j\omega C}} \qquad (1)$$

In order to find the real and imaginary parts of the characteristic impedance, some calculations are needed. To start with, equation (1) is squared and then the real and imaginary parts of the squared expression are identified. In order to simplify calculations further, the conductance is assumed to be negligible.

$$(\psi + j\zeta)^2 = \frac{R + j\omega L}{G + j\omega C}$$

$$\begin{cases} \psi^2 - \zeta^2 = \frac{L}{C} \Leftrightarrow \psi^2 = \frac{L}{C} + \zeta^2 \\ j2\psi\zeta = \frac{R}{j\omega C} \Leftrightarrow \zeta = \frac{-R}{2\psi\omega C} \end{cases}$$

$$\begin{cases} \psi^2 = \frac{L}{C} + \left(\frac{-R}{2\psi\omega C}\right)^2 \Leftrightarrow \psi^4 - \psi^2\frac{L}{C} - \left(\frac{R}{2\omega C}\right)^2 = 0 \Leftrightarrow \psi^2 = \frac{L}{2C} + \sqrt{\left(\frac{L}{2C}\right)^2 + \left(\frac{R}{2\omega C}\right)^2} \\ \zeta^2 = \frac{-L}{C} + \left(\frac{-R}{2\zeta\omega C}\right)^2 \Leftrightarrow \zeta^4 + \zeta^2\frac{L}{C} - \left(\frac{R}{2\omega C}\right)^2 = 0 \Leftrightarrow \zeta^2 = \frac{-L}{2C} + \sqrt{\left(\frac{L}{2C}\right)^2 + \left(\frac{R}{2\omega C}\right)^2} \end{cases}$$

$$\begin{cases} \psi^2 = \frac{L}{2C}\left(1 + \sqrt{1 + \left(\frac{R}{\omega L}\right)^2}\right) \\ \zeta^2 = \frac{L}{2C}\left(-1 + \sqrt{1 + \left(\frac{R}{\omega L}\right)^2}\right) \end{cases}$$

$$\begin{cases} \psi = \sqrt{\frac{L}{2C}\left(1 + \sqrt{1 + \left(\frac{R}{\omega L}\right)^2}\right)} \\ \zeta = -\sqrt{\frac{L}{2C}\left(-1 + \sqrt{1 + \left(\frac{R}{\omega L}\right)^2}\right)} \end{cases}$$

For small values of $$\frac{R}{\omega L},$$

the Taylor series expansion can be used to get $$\psi \approx \sqrt{\frac{L}{2C}\left(1 + 1 + \frac{1}{2}\left(\frac{R}{\omega L}\right)^2\right)} =$$

$$\sqrt{\frac{L}{C}\left(1 + \frac{1}{4}\left(\frac{R}{\omega L}\right)^2\right)} \approx \sqrt{\frac{L}{C}}\left(1 + \frac{1}{8}\left(\frac{R}{\omega L}\right)^2\right) \approx \sqrt{\frac{L}{C}}$$

$$\zeta \approx -\sqrt{\frac{L}{2C}\left(1 - 1 + \frac{1}{2}\left(\frac{R}{\omega L}\right)^2\right)} = -\sqrt{\frac{L}{C}\left(\frac{1}{4}\left(\frac{R}{\omega L}\right)^2\right)} = \frac{-R}{2\omega\sqrt{LC}}$$

Thus, except for at very low frequencies, the characteristic impedance can be approximated as $$Z_C \approx \sqrt{\frac{L}{C}} - j\frac{R}{2\omega\sqrt{LC}} \quad (2)$$

For high frequencies, the imaginary part diminishes clue to the angular frequency term in the denominator and the characteristic impedance becomes essentially real, approaching a constant value for high frequencies. For DSL applications, the high frequency impedance is typically in the range 100-130Ω although some (short) aerial drop wires from the telephone pole to the customer premises can have characteristic impedances up to almost 200Ω.

A similar derivation like the above but for very low frequencies may give the approximation $$Z_C \approx (1 - j)\sqrt{\frac{R}{2\omega C}},$$

showing that the characteristic impedance at low frequencies could be calculated from the effective resistance and the capacitance.

A propagation constant F describes how a signal is affected when travelling along a transmission line. It contains a real part giving attenuation in neper and an imaginary part which gives the phase in radians.

$$\Gamma = \alpha + j\beta = \sqrt{(R + k\omega L)(G + j\omega C)} \quad (3)$$

In a similar manner as for the characteristic impedance, the real and imaginary parts can be found by squaring and identifying the real and imaginary parts of the squared propagation constant.

$$(\alpha + j\beta)^2 = (R + j\omega L)(G + j\omega C)$$

Assuming that the shunt conductance G is negligible we get $$\alpha^2 - \beta^2 + j\alpha\beta = (R + j\omega L)j\omega C$$

$$\begin{cases} \alpha^2 - \beta^2 = -\omega^2 LC \\ j2\alpha\beta = j\omega RC \end{cases} \Leftrightarrow \begin{cases} \alpha^2 = \beta^2 - \omega^2 LC \\ \beta = \frac{\omega RC}{2\alpha} \end{cases}$$

Similar manipulations as for the characteristic impedance $Z_c$ yields $$\begin{cases} \alpha = \sqrt{\frac{\omega^2 LC}{2} \cdot \left(\sqrt{1 + \left(\frac{R}{\omega L}\right)^2} - 1\right)} \\ \beta = \sqrt{\frac{\omega^2 LC}{2} \cdot \left(\sqrt{1 + \left(\frac{R}{\omega L}\right)^2} + 1\right)} \end{cases}$$

For small values of $$\frac{R}{\omega L},$$

we get $$\alpha \approx \sqrt{\frac{\omega^2 LC}{2} \cdot \left(1 + \frac{1}{2}\left(\frac{R}{\omega L}\right)^2 - 1\right)} = \sqrt{\frac{R^2 C}{4L}} = \frac{R}{2}\sqrt{\frac{C}{L}}$$

$$\beta = \sqrt{\frac{\omega^2 LC}{2} \cdot \left(1 + \frac{1}{2}\left(\frac{R}{\omega L}\right)^2 + 1\right)} =$$

$$\sqrt{\omega^2 LC \cdot \left(1 + \frac{1}{4}\left(\frac{R}{\omega L}\right)^2\right)} \approx \omega\sqrt{LC} \cdot \left(1 + \frac{1}{8}\left(\frac{R}{\omega L}\right)^2\right) \approx \omega\sqrt{LC}$$

Combining the above result with (2) yields $$\Gamma = \alpha + j\beta \approx \frac{R}{2}\sqrt{\frac{C}{L}} + j\omega\sqrt{LC} \approx \frac{R}{2\text{Re}(Z_C)} - j\frac{R}{2\text{Im}(Z_C)} \quad (4)$$

Since β describes the signal phase, it is possible to determine the signal's Velocity of Propagation (VOP) as $$v = \frac{\omega \cdot l}{\beta} \approx \frac{l}{\sqrt{LC}} \approx \frac{1}{\sqrt{L'C'}} \approx -\frac{2\omega \text{Im}(Z_C)}{R'} \quad (5)$$

where l is the loop length (or loop segment length). The relation between impedance, capacitance per length unit and VOP becomes $$C' = \frac{1}{\text{Re}(Z_C) \cdot v} \quad (6)$$

In the following section of the detailed description formulas for the resistance of a pair of straight parallel wires utilized in embodiments of the present invention are described. This is a simplification since a telecommunication cable typically contains multiple pairs and also since the pairs are usually twisted to reduce interference. The geometry of an insulated wire pair 10 is shown in FIG. 1 where the wire separation s equals twice the radius r of the conductor 12 plus twice the thickness of the insulator 14.

Given the permeability μ (H/m) and conductivity σ (S/m), the surface resistivity can be calculated as $$R_s = \sqrt{\frac{\pi f \mu}{\sigma}}$$

where f is the frequency (Hz) and $\mu=\mu_0\mu_r$ is the permeability of vacuum multiplied by the relative permeability of the conductor. For non-magnetic metals (e.g. copper and aluminium), the relative permeability is practically equal to one. Further, for copper, which is the most common conductor material in telephone lines, the conductivity is typically $5.8 \cdot 10^7$ S/m, while the conductivity of aluminium is $3.8 \cdot 10^7$ S/m.

The skin effect is the tendency of an alternating electric current to distribute itself within a conductor so that the current density near the surface of the conductor is greater than that at the core of the conductor. That is, the electric current tends to flow at the skin of the conductor, at an average depth called the skin depth. The skin effect causes the effective resistance of the conductor to increase with the frequency of the current. The skin depth can be calculated as $$\delta = \frac{1}{\sqrt{\pi f \mu \sigma}}$$

and the direct current (zero frequency) resistance per meter:

$$R'_0 = \frac{2}{\sigma \pi r^2} \quad (7)$$

where r is the radius of the conductor 12 as shown in FIG. 1. Now, the resistance per meter in the skin effect region i.e. where the radius of the conductor r is much larger than the skin depth is given by $$R'_{skin} = \frac{2R_s \kappa}{2\pi r} = \frac{2\sqrt{\frac{\pi f \mu}{\sigma}} \kappa}{2\pi r} = \sqrt{\frac{f\mu}{\sigma \pi r^2}} \kappa = \sqrt{\frac{f\mu R'_0}{2}} \kappa \quad (8)$$

where κ is the proximity factor, correcting for the proximity effect, which increases resistance when the conductors move closer to each other. Thus, the effective resistance per meter for both low and high frequencies can be calculated using a similar approach as in known cable models.

$$R' = \sqrt[4]{(R'_0)^4 + (R'_{skin})^4} = \quad (9)$$

$$R'_0 \cdot \sqrt[4]{1 + \left(\frac{R'_{skin}}{R'_0}\right)^4} = R'_0 \cdot \sqrt[4]{1 + \left(\frac{\sqrt{\frac{f\mu R'_0}{2}}\kappa}{R'_0}\right)^4} =$$

$$R'_0 \cdot \sqrt[4]{1 + \left(\sqrt{\frac{f\mu}{2R'_0}}\kappa\right)^4} = R'_0 \cdot \sqrt[4]{1 + \left(\frac{f\mu\kappa^2}{2R'_0}\right)^2}$$

Now, comparing the above equation with a known resistance model allows identification of a breakpoint frequency $f_0$ $$R' = R'_0 \cdot \sqrt[4]{1 + \left(\frac{f}{f_0}\right)^2} \Leftrightarrow f_0 = \frac{2R'_0}{\mu\kappa^2} \quad (10)$$

It should be noted that the breakpoint frequency of the resistance is proportional to the direct current (DC) resistance per length unit, which allows estimation of the breakpoint frequency and thus also the high-frequency resistance if the DC resistance is known.

In order to determine the breakpoint frequency accurately, some a priori information regarding the proximity factor is necessary, e.g. that it is almost constant for the cables of interest or that the thickness of the insulator 14 as shown in FIG. 1 is known so that the proximity factor can be calculated based on the wire radius (as wire radius can be calculated from DC resistance). A further option is to estimate the proximity constant from the characteristic impedance (if it is known) e.g. as shown in equation (11c). For a two-conductor cable, the proximity factor is given $$\kappa = \frac{1}{\sqrt{1 - \left(\frac{2r}{s}\right)^2}}$$

where s is the center-to-center distance between the two conductors as shown in FIG. 1. For multi-pair cables, the above formula is not necessarily accurate and may need some correction. For non-magnetic cables, the proximity factor is likely between 1 and 2, depending on the ratio between the radius of the conductor r and the center-to-center distance s. A proximity factor of 1 corresponds to infinite separation distance.

Further, the total resistance of the transmission line is the resistance per meter times the loop length l $$R = R'l$$

In the following section of the detailed description formulas calculating the inductance and capacitance of a pair of parallel wires utilized in embodiments of the present invention are described.

Inductance for a pair of parallel wires consists of a frequency-dependent internal inductance and a geometry-dependent external inductance. For a twisted-pair transmission line, additional inductance due to twisting may be present but is neglected here. Thus, the inductance per length unit is $$L' = L'_{int} + L'_{ext}$$

In order for the transmission line to have a causal time-domain impulse response, the internal inductance must be equal to the Hilbert transform of the resistance. In the skin effect region, this practically means that the internal reactance equals the resistance:

$$\omega L'_{int} \approx R' \Leftrightarrow L'_{int} \approx \frac{R'}{\omega} \approx \frac{1}{2\pi}\sqrt{\frac{\mu R_0}{2f}}\kappa \quad (11)$$

Since frequency is in the denominator, the internal inductance approaches zero for high frequencies.

The external inductance per length unit for two parallel wires is given by $$L'_{ext} = \frac{\mu}{\pi}\mathrm{acosh}\left(\frac{s}{2r}\right) = \frac{\mu}{\pi}\mathrm{acosh}\left(\frac{1}{\sqrt{1 - \frac{1}{\kappa^2}}}\right) = \ldots = \frac{\mu}{\pi}\log\left(\frac{\kappa+1}{\sqrt{\kappa^2 - 1}}\right) \quad (11b)$$

and the capacitance per length unit is $$C' = \frac{\pi\varepsilon}{\mathrm{acosh}\left(\frac{s}{2r}\right)}$$

where the permittivity of the dielectric insulator $\varepsilon = \varepsilon_0 \varepsilon_r$ is the permittivity of vacuum multiplied by the relative permittivity of the conductor. For high frequencies, when the internal inductance is negligible, the real part of the characteristic impedance becomes $$\mathrm{Re}(Z_C) \approx \sqrt{\frac{L_{ext}}{C}} = \quad (11c)$$

$$\sqrt{\frac{\mu}{\varepsilon}} \cdot \frac{1}{\pi}\mathrm{acosh}\left(\frac{s}{2r}\right) = \sqrt{\frac{\mu}{\varepsilon}} \cdot \frac{1}{\pi}\mathrm{acosh}\left(\frac{1}{\sqrt{1-\frac{1}{\kappa^2}}}\right)$$

which shows that there is a relation between the characteristic impedance and the proximity factor. If one of these parameters is known, the other can be calculated (assuming that the permittivity is known).

A common measure of attenuation is the so called insertion loss, which represents the increase in attenuation when a transmission line (or other device) is inserted between transmitter and receiver, compared with the attenuation when transmitter and receiver are connected directly.

When source and termination impedances are equal, $Z_s = Z_t$, insertion loss in dB can be simplified to $$IL = 20\log_{10}\left|\cosh(\Gamma) + \frac{1}{2}\sinh(\Gamma) \cdot \left(\frac{Z_s}{Z_c} + \frac{Z_c}{Z_s}\right)\right| \quad (12)$$

Further, when the source impedance is not too different from the line's characteristic impedance (usually true in a well-designed system except for at low frequencies where the characteristic impedance changes dramatically), the sum in the rightmost parenthesis above approaches 2, which then yields the high-frequency approximation $$IL_{HF} \approx 20\log_{10}|\cosh(\Gamma) + \sinh(\Gamma)| = \quad (13)$$

$$20\log_{10}|e^\Gamma| = 20\log_{10}(e^\alpha) = = 20\log_{10}(e)\cdot\alpha \approx 8.686\cdot\alpha$$

Thus, in this case (typically at frequencies above a couple of tens of kilohertz), insertion loss is determined by the real part of the propagation constant, multiplied by a neper-to-decibel conversion factor.

For low frequencies or short transmission lines, the propagation constant is small, meaning that Taylor series expansion of the hyperbolic trigonometric functions can be used, together with the definitions of the propagation constant (equation (3)) and the characteristic impedance (equation (1)), to get $$IL_{LF} \approx 20\log_{10}\left|1 + \frac{\Gamma}{2} \cdot \left(\frac{Z_s}{Z_c} + \frac{Z_c}{Z_s}\right)\right| = \quad (14)$$

$$20\log_{10}\left|1 + \frac{\Gamma}{Z_c} \cdot \frac{Z_s}{2} + \Gamma \cdot Z_c \cdot \frac{1}{2Z_s}\right| =$$

$$20\log_{10}\left|1 + (G + j\omega C) \cdot \frac{Z_s}{2} + (R + j\omega L) \cdot \frac{1}{2Z_s}\right| \approx 20\log_{10}\left|1 + \frac{R}{2Z_s}\right|$$

In the last step of the above equation, it is also assumed that the conductance was negligible. One conclusion here is that insertion loss for low frequencies is determined mainly by the ratio between the transmission line resistance and the source impedance. For frequencies far below the skin effect region, the resistance is essentially constant and can be approximated with the DC resistance. The insertion loss at DC is $$IL_{DC} = 20\log_{10}\left|1 + \frac{R_0}{2Z_s}\right| \quad (15)$$

The above equation was derived based on the assumption that source and termination impedance are equal. If this is not the case, a more general equation for the Insertion Loss at DC is (based on voltage division)

$$IL_{DC} = 20\log_{10}\left|\frac{Z_s + Z_t + R_0}{Z_s + Z_t}\right| = 20\log_{10}\left|1 + \frac{R_0}{Z_s + Z_t}\right| \quad (16)$$

It should be noted that Insertion Loss (in dB) for high frequencies, is proportional to loop length since $\alpha$ is proportional to loop length. This is not generally true for Insertion Loss at low frequencies (e.g. equations (14), (15), (16)). However, for short loops i.e. when $R_0 \ll Z_s + Z_t$ it is possible to utilize a Taylor series expansion of equation (16) in order to get the approximation $$IL_{DC} \approx \frac{20}{\log_e(10)} \cdot \frac{R_0}{Z_s + Z_t} \quad (17)$$

where it for simplicity is assumed that the source impedance is real. If source and termination impedance are equal, this can of course be further simplified to $$IL_{DC} \approx \frac{20}{\log_e(10)} \cdot \frac{R_0}{2Z_s} \quad (18)$$

Since resistance is proportional to loop length, the above two equations show that for low frequencies, insertion loss is proportional to loop length if the loop length is small.

In the following section of the detailed description wire gauge and DC resistance estimation are described.

If the insertion loss is given or measured at a very low frequency, such as in the POTS band (0-4 kHz) or slightly above (e.g. a frequency low enough that the skin effect is substantially not noticeable), the DC resistance can be solved from equation (15) given the source impedance. If we for simplicity assume that the source impedance is real, this yields the total DC resistance $$R_0 = 2Z_s\left(10^{\frac{IL_{DC}}{20}} - 1\right) \quad (19)$$

It is then possible to estimate the DC resistance per length unit if the loop length is known. Further, if desired, the wire radius can be estimated using (7).

For short loops, the above equation can be simplified to $$R_0 \approx \frac{\log_e(10)}{20} \cdot IL_{DC}(Z_s + Z_t) \quad (20)$$

where DC resistance is proportional to the total insertion loss.

In the following it is described how to determine wire gauge and DC resistance in embodiments of the present invention if the insertion loss is given at a frequency far above the POTS band (e.g. at typical xDSL frequencies).

From equation (4), we have that $\alpha$, the attenuation in neper, is given by $$\alpha = \frac{R}{2\,\mathrm{Re}(Z_c)}$$

and as previously described the insertion loss in dB for high frequencies (above some tens of kilohertz, depending on cable type) can be calculated as $$IL_{HF} \approx 20\log_{10}(e) \cdot \alpha$$

Further, the resistance is given by $$R \approx R'_{skin}l = \sqrt{\frac{f\mu}{\sigma\pi r^2}}\,\kappa l$$

Combining the above equations yields $$IL_{HF} = 20\log_{10}(e)\sqrt{\frac{f\mu}{\sigma\pi r^2}}\,\frac{\kappa l}{2\,\mathrm{Re}(Z_c)} \quad (21)$$

Or equivalently $$IL_{HF} = 20\log_{10}(e)\sqrt{\frac{f\mu R'_0}{2}}\,\frac{\kappa l}{2\,\mathrm{Re}(Z_c)} \quad (22)$$

Rewriting this as $$IL_{HF,1} \approx c_1\sqrt{f} \quad (23)$$

yields one prior art approximation of insertion loss (or attenuation) as a constant multiplied by the square root of frequency. The constant $c_1$ can be determined by measuring attenuation at a single frequency as long as the frequency is sufficiently high for the approximations to be valid. A problem with this approximation is that it does not work well for low frequencies since it assumes that $\mathrm{Re}(Z_c)$ is constant over frequency and since effective resistance is not proportional to the square root of frequency for low frequencies. Also, as was previously shown, insertion loss at low frequencies involves the source and termination impedances as well as the resistance. All in all, this means that the simple approximation above is e.g. suitable for most of the ADSL downstream frequencies but not for the upstream frequencies.

Since equation (21) is inversely proportional to the wire radius, r, it seems reasonable to write insertion loss as another constant times loop length and square-root of frequency and divided by the wire radius $$IL_{HF,2} \approx \frac{c_2 l \sqrt{f}}{r} \qquad (24)$$

Solving for the constant gives $$c_2 = \frac{IL_{HF}}{l} \cdot \frac{r}{\sqrt{f}} \qquad (25)$$

In order to verify equation (24), the proportionality constant has been estimated using equation (25) for a number of different cable diameters, calculating insertion loss using the ETSI cable models together with equation (12) at both 300 kHz and 1 MHz. FIG. 2 shows the results of the determination of the proportionality constant from equation (25) based on the ETSI cable models and insertion loss per km at 300 kHz and 1 MHz.

As can be seen in FIG. 2, the proportionality factor is very similar for the different cable diameters and does not change substantially between 300 kHz and 1 MHz, suggesting that the wire radius can be estimated if the insertion loss per length unit is known at a single frequency. A nearly constant proportionality factor also suggests that the ratio between the proximity factor and the real part of the characteristic impedance in equation (14) does not change substantially for different cables. For the tested ETSI cables, the mean value of the proportionality factor is $$\bar{c}_{2,ETSI} = 0.0050 \qquad (26)$$

It should be noted that other cable types can have substantially different values of the proportionality factor, especially if they contain magnetic materials (e.g. steel reinforced wires). Such wires have relative permeability values substantially larger than 1 but are only common for the short final drop cables close to the subscriber. There could still be variations in the proportionality factor due to design differences (different proximity factor and different characteristic impedance) but if the final drop cables are excluded, these variations will likely be on the order of 10-20% or less for common transmission lines used in xDSL applications. Further, if the characteristic impedance is known, it can be used to improve the accuracy since one source of variation is removed from equation (21).

Now, an estimate $\hat{r}$ of the wire radius can be found as:

$$\hat{r} = \frac{c_2 \sqrt{f_\Phi}}{IL'_\Phi} \qquad (27)$$

Where $IL'_\Phi$ is the given or measured insertion loss per length unit at frequency $f_\Phi$.

Once the wire radius is known, the DC resistance per length unit can be calculated from equation (7). Multiplying this with the loop length gives the total DC resistance. The estimated wire radius can also be used for other purposes than to determine resistance, e.g. to determine the average cable gauge between DSLAM and CPE.

Since embodiments of the present invention is based on limited information regarding the cable, it is advantageous to use a cable model with as low order as possible, i.e. few parameters. Such a model could be the known BT0H model, using only four parameters to fully describe impedance and propagation characteristics per length unit for a twisted-pair cable with negligible conductance. In one embodiment of the present invention one parameter i.e. insertion loss per length unit is used. In another embodiment two parameters i.e. the additional characteristic impedance parameter is used. This is feasible partially thanks to the fact that the invention does not require accurate phase information and hence some basic assumptions can be made.

Embodiments of the method according to the present invention will now be explained in connection with FIGS. 3a, 3b, 3c, 3d and 3e illustrating flow diagram of embodiments of the method.

Figure 3A:
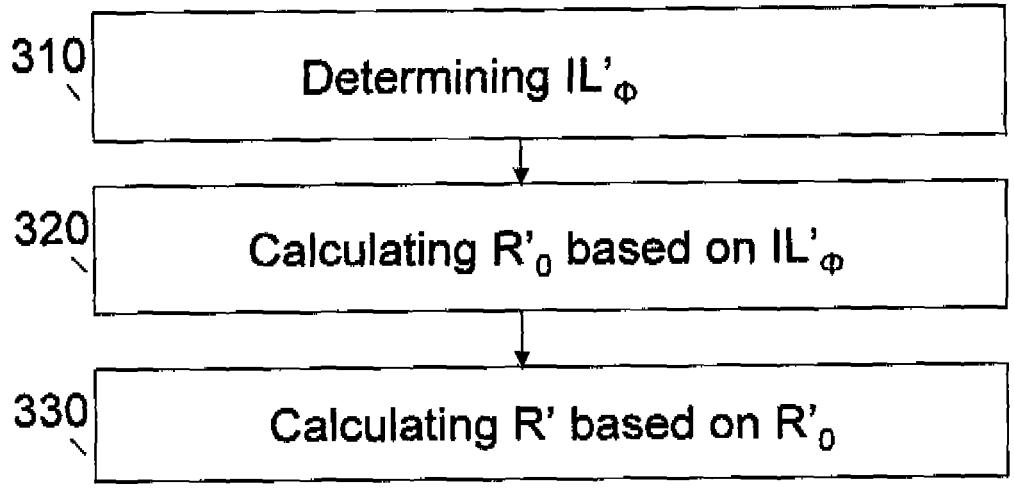
FIG. 3a is a flow diagram of an embodiment of the present invention.

Referring to FIG. 3a when estimating frequency dependent effective resistance of a transmission line in a telecommunication system, insertion loss per length unit $IL'_\Phi$ of the transmission line at a first frequency $f_\Phi$ is determined in a step 310. The insertion loss at the first frequency could be measured or given. The insertion loss can be measured by using SELT which commonly includes two types of measurements. The first is an echo measurement, which is used to e.g. estimate the loop length and insertion loss. The second measurement is a Quiet Line Noise (QLN) measurement, which measures the received signal (noise) at the near end when all transmitters connected to the transmission line are silent. Thereafter, in step 320, a first resistance per length unit $R'_0$ is calculated based on the determined insertion loss per length unit $IL'_\Phi$ of the transmission line at the first frequency $f_\Phi$. In an embodiment of the present invention the calculated first resistance per length unit is the resistance of the transmission line at DC or at a frequency which is close enough to DC that the skin effect is substantially not noticeable. That is, if the first frequency $f_\Phi$ is below or equal than a threshold value the first resistance per length unit $R'_0$ is calculated according to equation (19) above $$R'_0 = 2Z_s \left(10^{\frac{IL'_\Phi}{20}} - 1\right)$$

wherein it is assumed that the source impedance $Z_s$ and termination impedance $Z_t$ are approximately equal. However, the calculation of the first resistance per length unit $R'_0$ may also be based on the termination impedance. If the first frequency $f_\Phi$ is larger than the threshold value the first resistance per length unit is calculated according to equations (27) and (7) above $$R'_0 = \frac{2}{\sigma \pi \hat{r}^2}$$

and $$\hat{r} = \frac{c_2 \sqrt{f_\Phi}}{IL'_\Phi}$$

wherein the constant $c_2$ is in the range $4.9 \cdot 10^{-3}$ to $5.2 \cdot 10^{-3}$ as shown in FIG. 2. Next, in step 330, the effective resistance per length unit R' at a second frequency f is calculated. The calculation is based on the calculated first resistance according to equation (10) above $$R' = R'_0 \cdot \sqrt[4]{1 + \left(\frac{f}{f_0}\right)^2}$$

where $f_0$ is calculated based on $R'_0$ according to $$f_0 = \frac{2R'_0}{\mu\kappa^2}$$

where $\mu$ is the permeability of the conductor of the transmission line and $\kappa$ is the proximity factor of the conductor of the transmission line. The threshold value is substantially the cutoff frequency for the skin effect, such that for frequencies far below it the effective resistance is essentially constant and for frequencies far above it the effective resistance increases essentially as the square root of frequency.

Figure 3B:
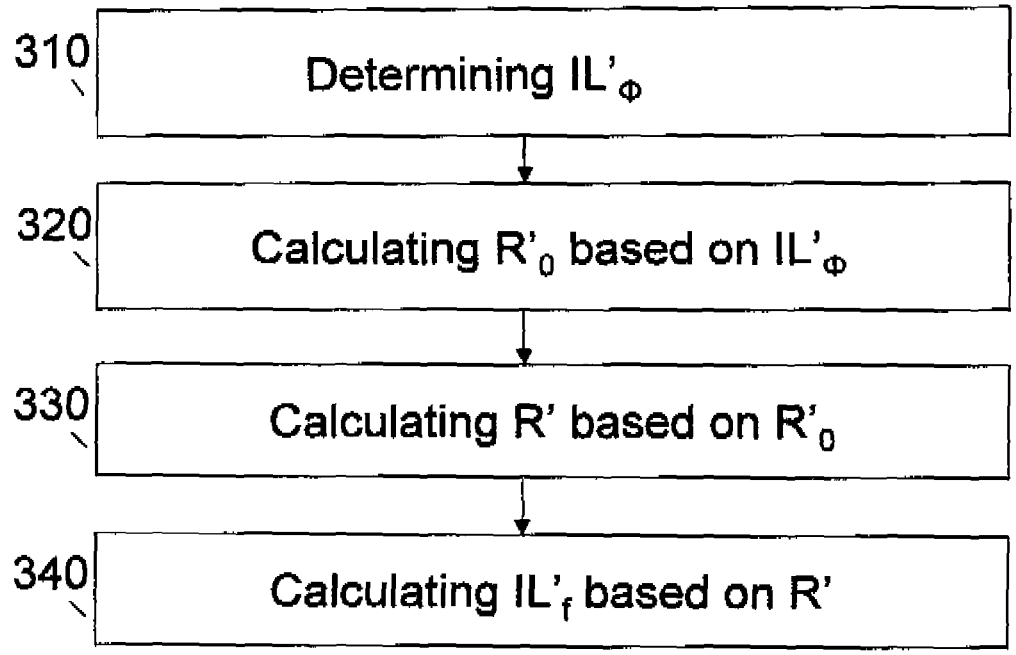
FIG. 3b is a flow diagram of an embodiment of the present invention wherein the insertion loss at the second frequency is calculated.

FIG. 3b illustrates a flow diagram of an embodiment of the present invention wherein insertion loss at the second frequency is calculated in a step 340 based on the calculated effective resistance per length unit R' In an embodiment of the present invention, when the second frequency is a low frequency e.g. in the POTS band, the insertion loss at the second frequency $IL_f$ is calculated according to equation (14) above $$IL_f \approx 20 \log_{10}\left|1 + \frac{R'}{2Z_s}\right|$$

When the second frequency is a high frequency e.g. above the POTS band the insertion loss is calculated in accordance with equation (23) above $$IL_f \approx c_1\sqrt{f}$$

In an embodiment of the present invention the insertion loss $IL_f$ is estimated in accordance with both equation (14) and (23) whereupon the insertion loss is determined to be the maximum value of the two estimates for all frequencies of interest. In appendix the insertion loss $IL_f$ calculated according to the above embodiment of the present invention for all frequencies of interest could be seen in diagram 1.

Figure 3C:
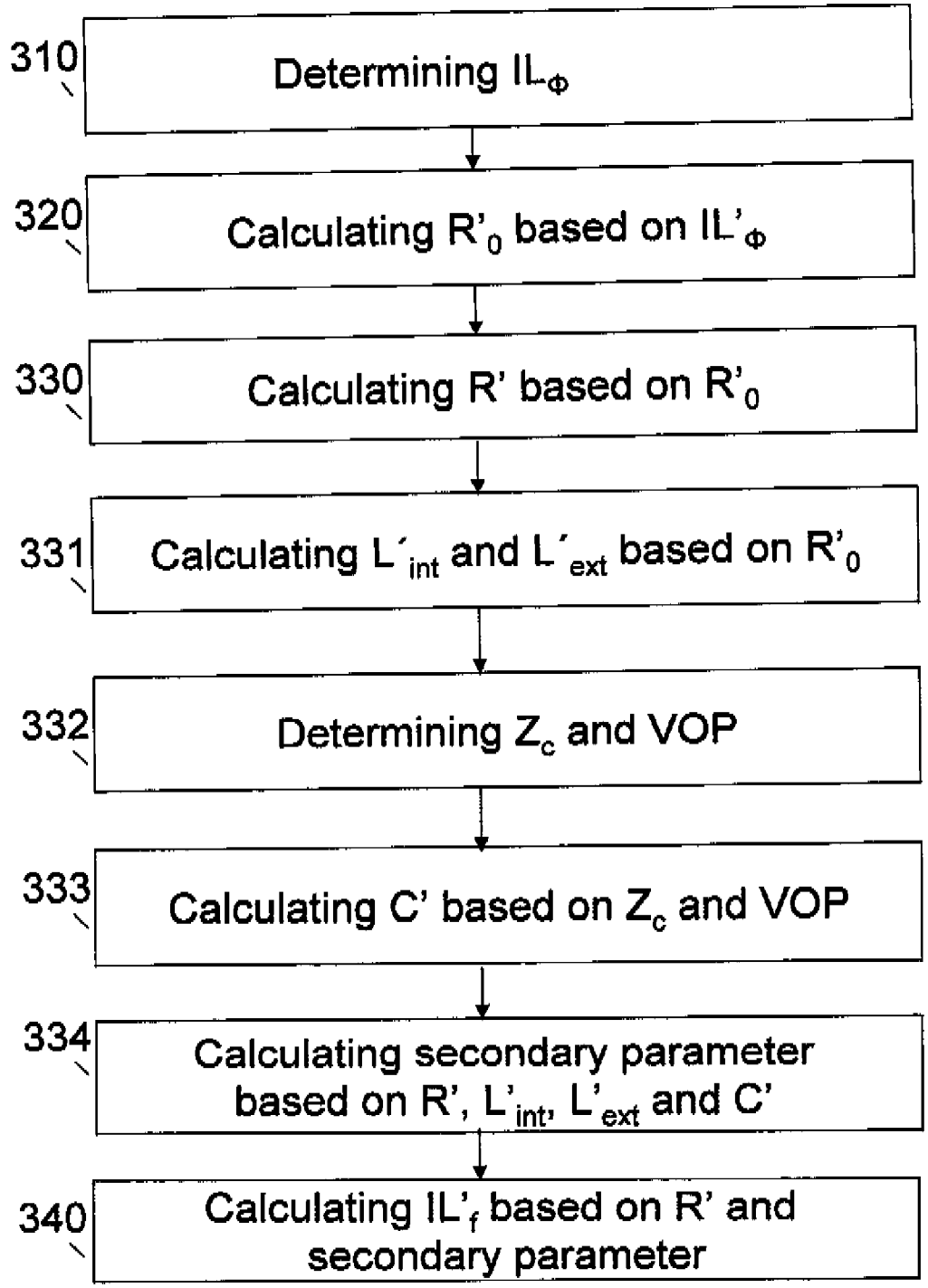
FIG. 3c is a flow diagram of an embodiment of the present invention, wherein the primary and the secondary parameters are calculated.

FIG. 3c is a flow diagram of another embodiment of the present invention, which also improves the estimation of the insertion loss in the transition region between low and high frequencies. In a step 331, the first resistance per length unit $R'_0$ calculated in step 320 is used when the primary parameters internal inductance per length unit $L'_{int}$ and external inductance per length unit are calculated. The internal inductance per length unit $L'_{int}$ may be calculated using the Hilbert transform for the second frequency. However, it could also be calculated in accordance with equation (11)

$$L'_{int} \approx \frac{1}{2\pi}\sqrt{\frac{\mu R'_0}{2f}}\,\kappa$$

The external inductance per length unit $L'_{ext}$ can be calculated according to equation (11b) above $$L'_{ext} = \frac{\mu}{\pi}\log\left(\frac{\kappa+1}{\sqrt{\kappa^2-1}}\right)$$

Alternatively, if the capacitance is already determined, the external inductance per length unit can be calculated so that the calculated insertion loss per length unit equals the determined insertion loss per length unit at the first frequency $f_\Phi$. The alternative method is based on solving the inductance from the combination of equation (4) and (13) and then subtracting the calculated internal inductance in order to get the external inductance. In an embodiment of the present invention, in order to improve the calculations of the internal inductance $L'_{int}$ and external inductance $L'_{ext}$ the calculations are further based on the characteristic impedance at the first frequency $f_\Phi$ or a further frequency. In a further step 332, the primary parameter characteristic impedance at the first frequency $f_\Phi$ or at another frequency is determined. Furthermore a velocity of propagation (VOP) parameter associated with the transmission line is determined. Next in step 333, the capacitance C' is calculated based on the determined characteristic impedance and VOP parameter v according to equation (6) above $$C' = \frac{1}{\text{Re}(Zc) \cdot v}$$

Since most cables have a VOP parameter of about 190-220 Mm/s, a VOP value of e.g. 205 Mm/s can be used if no other information is available. If the characteristic impedance is not known, e.g. a value in the range 100-130 ohm may be used.

When the primary parameters i.e. effective resistance R', internal inductance $L'_{int}$ capacitance C' and external inductance $L'_{ext}$ per length unit are calculated the secondary parameter propagation constant per length unit at the second frequency is calculated in step 334 based on the primary parameters in accordance with equation (3) above $$\Gamma = \alpha + j\beta = \sqrt{(R'+j\omega L')(G+j\omega C')}$$

Additionally, the secondary parameter characteristic impedance per length unit at the second frequency is calculated in step 334 based on the primary parameters in accordance with equation (1) above $$Z_C = \psi + j\zeta = \sqrt{\frac{R'+j\omega L'}{G+j\omega C'}}$$

In the calculation performed in step 334 it can be assumed that the shunt conductance G is negligible. Finally, in step 340 the insertion loss per length unit $IL_f$ at the second frequency is calculated and is further based on the calculated secondary parameters according to equation (12) above $$IL_f = 20\log_{10}\left|\cosh(\Gamma) + \frac{1}{2}\sinh(\Gamma)\cdot\left(\frac{Z_s}{Z_c} + \frac{Z_c}{Z_s}\right)\right|$$

In appendix the insertion loss $IL_f$ calculated according to the above embodiment of the present invention for all frequencies of interest could be seen in diagram 2.

It should also be mentioned that in embodiments wherein the characteristic impedance is given the accuracy of the calculations of all primary parameters including the effective resistance could be improved.

According to a further embodiment of the present invention the method comprises the step of determining loop length of the transmission line. In a further step it is then possible to convert the primary and the secondary parameters per length unit to primary and secondary parameters describing the whole transmission line by multiplying the parameters per length unit with the loop length. Thereby the calculated insertion loss $IL_f$ at the second frequency describes the total insertion loss of the whole transmission line.

Figure 3D:
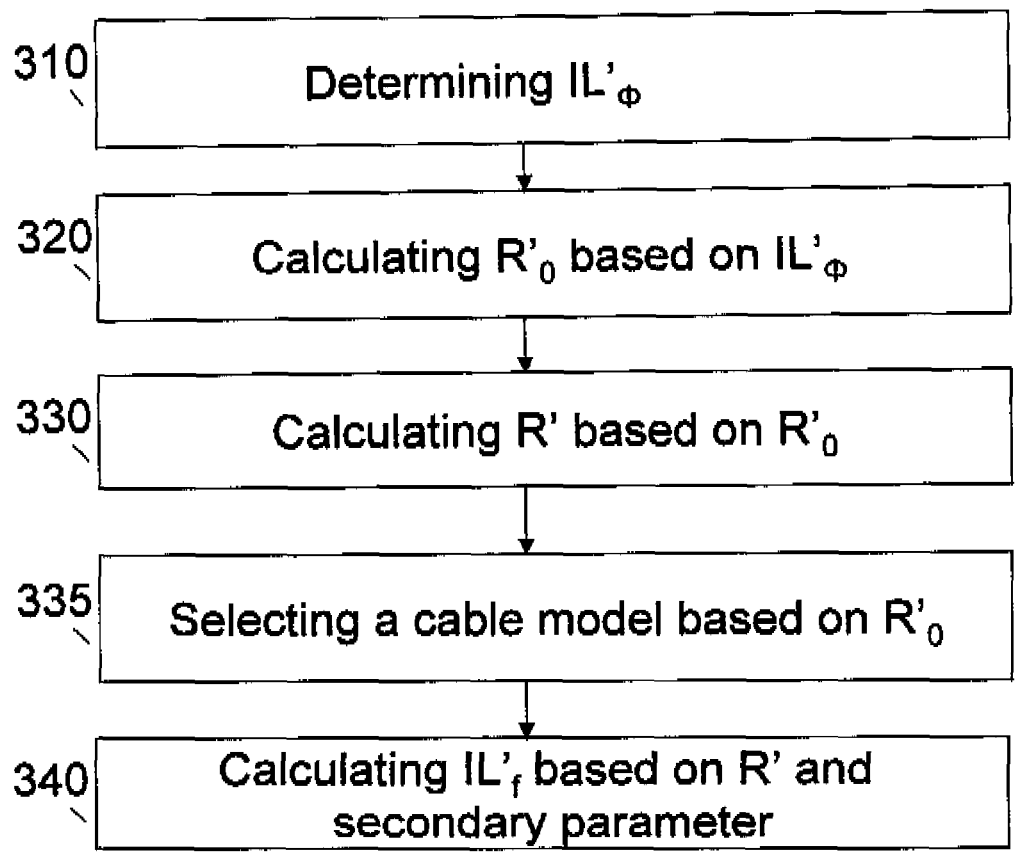
FIG. 3d is a flow diagram of an embodiment of the present invention, wherein a cable model is selected and the secondary parameters of the selected cable model are known.
Figure 3E:
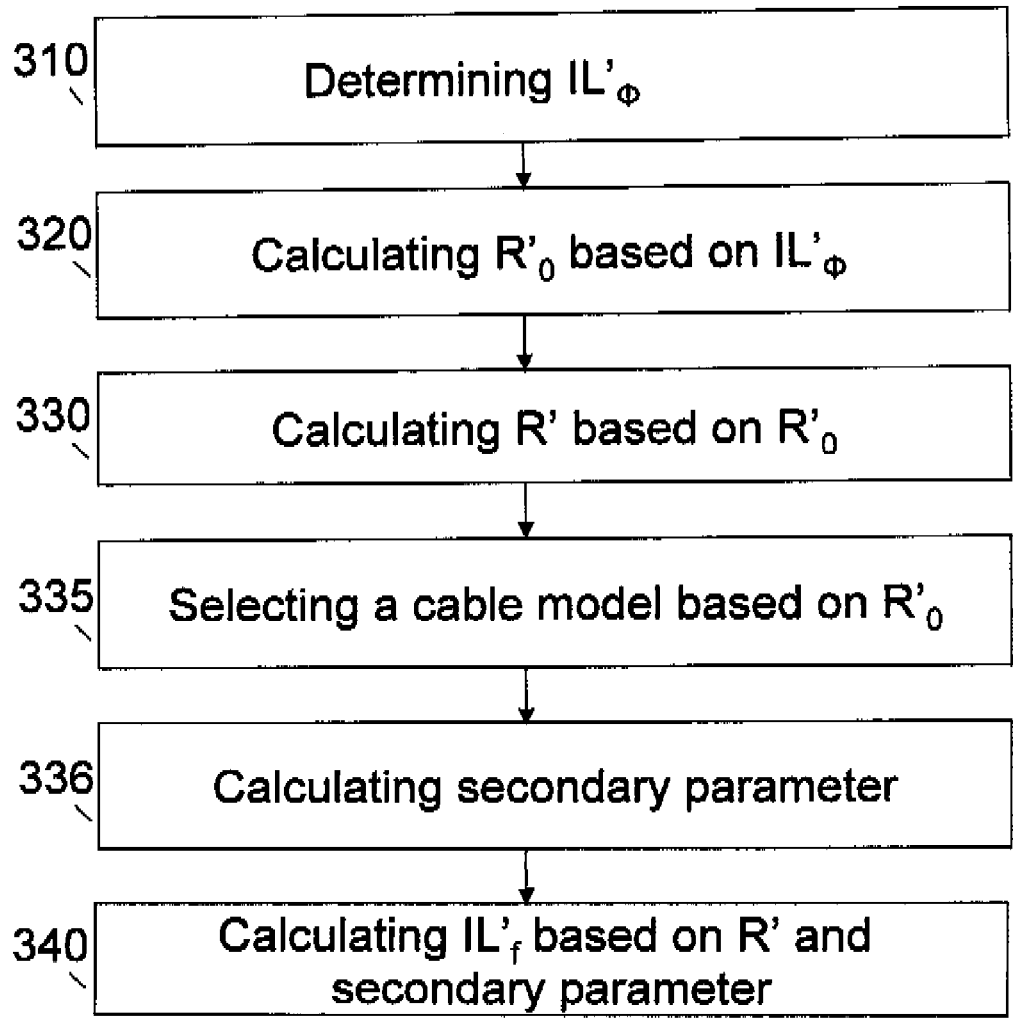
FIG. 3e is a flow diagram of an embodiment of the present invention, wherein a cable model is selected and the secondary parameters are calculated based on known primary parameters of the selected cable model.

FIGS. 3d and 3e illustrate flow diagrams of embodiments of the present invention, wherein a cable model which represents the transmission line is selected and either the primary or the secondary parameters of the selected cable model are known. The method comprises the additional step of selecting 335 a cable model from a set of predetermined cable models, which said cable model has a resistance per length unit or a wire radius which approximately corresponds to the calculated first resistance per length unit $R'_0$ of the transmission line. If the secondary parameters of the selected cable model are known the insertion loss $IL_f$ for the second frequency is then further based on the known secondary parameter of the cable model. If however the primary parameters of the selected cable model are known the secondary parameters could be calculated based on the known primary parameters in a step 336 (shown in FIG. 3e) in accordance with the above mentioned embodiments. The insertion loss $IL_f$ for the second frequency is then further based on the calculated secondary parameter of the cable model. The predetermined cable models could for example be the ETSI cable models.

Moreover, if the estimated first resistance value is between the resistance values of two known cable models, a combination of the two cable models can be used when calculating insertion loss, where the proportion of each cable model is selected so that the combined resistance values equals the calculated first resistance $R'_0$. This will typically be more accurate than selecting the cable model with the closest resistance value. For example, the first resistance is calculated as 200 ohm/km in step 320 and the two closest known cable models have a resistance value of 170 and 280 ohm/km, respectively. Thus, $$x \cdot 170 + (1-x) \cdot 280 = 200 \Rightarrow x = \frac{80}{110} \text{ km}$$

It is thus assumed that the loop consists of 30/110 length units of the 280 ohm cable and 80/110 length units of the 170 ohm cable.

Figure 4A:
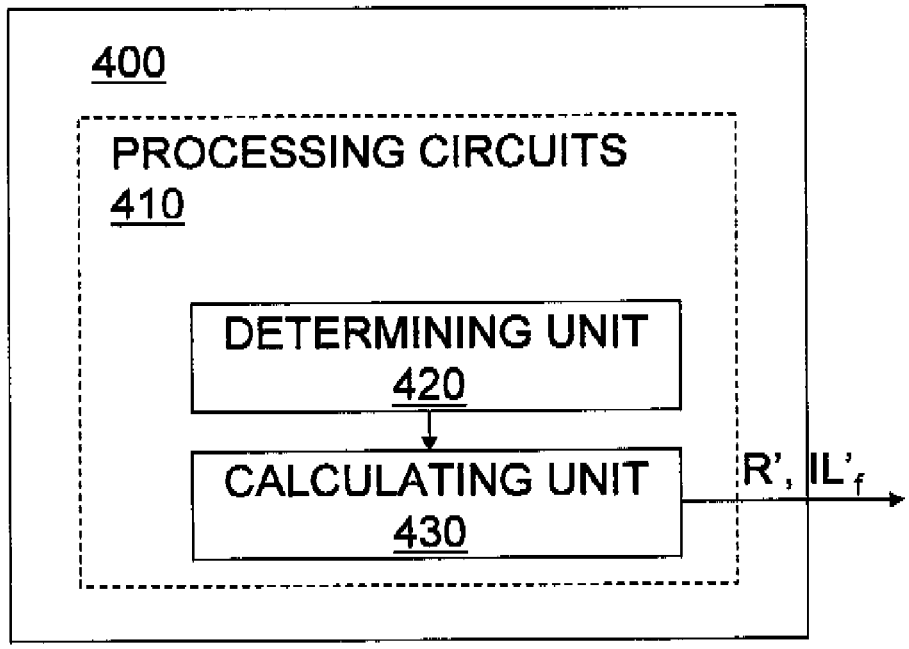
FIGS. 4a and 4b are block diagrams schematically illustrating embodiments of the present invention wherein the latter comprises a selecting unit configured to select a cable model.

FIG. 4a illustrates an arrangement 400 in a telecommunication system configured to estimate frequency dependent effective resistance of a transmission line, according to an exemplary embodiment. The arrangement 400 comprises a determining unit 420 configured to determine insertion loss per length unit of the transmission line at a first frequency. Further, the arrangement 400 comprises a calculating unit 430 configured to calculate a first resistance per length unit based on the determined insertion loss per length unit of the transmission line. The calculating unit is also configured to calculate effective resistance per length unit at a second frequency based on the calculated first resistance $R'_0$. In a further exemplary embodiment the calculating unit 430 is configured to calculate an insertion loss $IL_f$ per length unit at a second frequency based on the calculated effective resistance.

In still a further embodiment the calculating unit is configured to calculate internal inductance per length unit and external inductance per length unit of the transmission line based on the calculated first resistance per length unit $R'_0$ of the transmission line. The determining unit 420 is configured to determine characteristic impedance at the first frequency or a third frequency and a velocity of propagation parameter associated with the transmission line. Moreover, the calculating unit 430 is configured to calculate capacitance per length unit C' of the transmission line based on the determined characteristic impedance and velocity of propagation parameter and additionally configured to calculate a secondary parameter of the transmission line based on the calculated effective resistance, internal inductance, external inductance and capacitance providing the possibility to base the calculation of the insertion loss $IL_f$ for the second frequency on the calculated secondary parameter of the transmission line.

In yet a further embodiment the arrangement 400 comprises a determining unit configured to determine loop length of the transmission line and a converting unit configured to convert the primary and the secondary parameters per length unit to primary and secondary parameters describing the whole transmission line by multiplying the parameters per length unit with the loop length, wherein the calculated insertion loss $IL_f$ at the second frequency describes the total insertion loss of the whole transmission line.

Figure 4B:
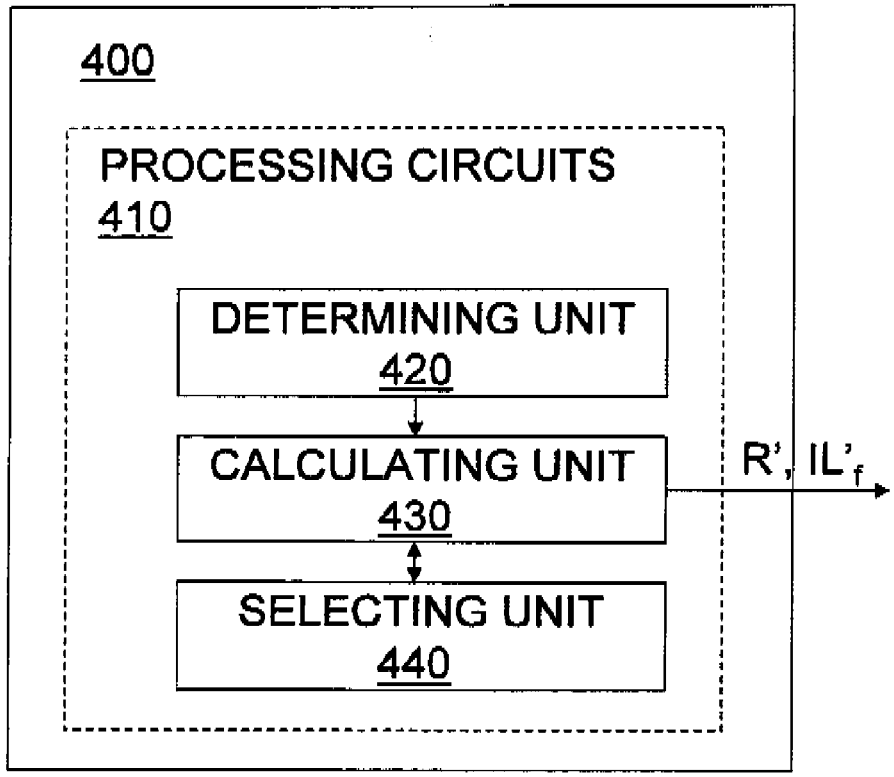

FIG. 4b illustrates an arrangement 400 in a telecommunication system configured to estimate frequency dependent effective resistance of a transmission line, according to another exemplary embodiment. The arrangement 400 comprises an additional selecting unit 440 configured to select a cable model from a set of predetermined cable models. The selected cable model has a resistance per length unit or a wire radius which approximately corresponds to the calculated first resistance per length unit of the transmission line. If the secondary parameters of the selected cable model are known the insertion loss for the second frequency is then further based on the known secondary parameter of the cable model. However, if the primary parameters of the selected cable model are known the secondary parameters could be calculated based on the known primary parameters. The insertion loss for the second frequency is then further based on the calculated secondary parameter of the cable model.

The arrangement could be implemented in various devices of the telecommunication system e.g. a DSLAM or a server connected to a DSLAM. Measurements and given input data could be performed by the arrangement but could also be provided by other means in the telecommunication system. It should be noted that the units illustrated in FIGS. 4a and 4b can be implemented as a single unit or be divided into several units. The units may be implemented by physical or logical entities such as processing circuits 410 using software functioning in conjunction with a programmed microprocessor or a general purpose computer, and/or using an application specific circuit (ASIC).

The present invention is not limited to the above-described preferred embodiments. Various alternatives, modifications and equivalents may be used. Therefore, the above embodiments should not be taken as limiting the scope of the invention, which is defined by the appending claims.

APPENDIX

Figure 5:
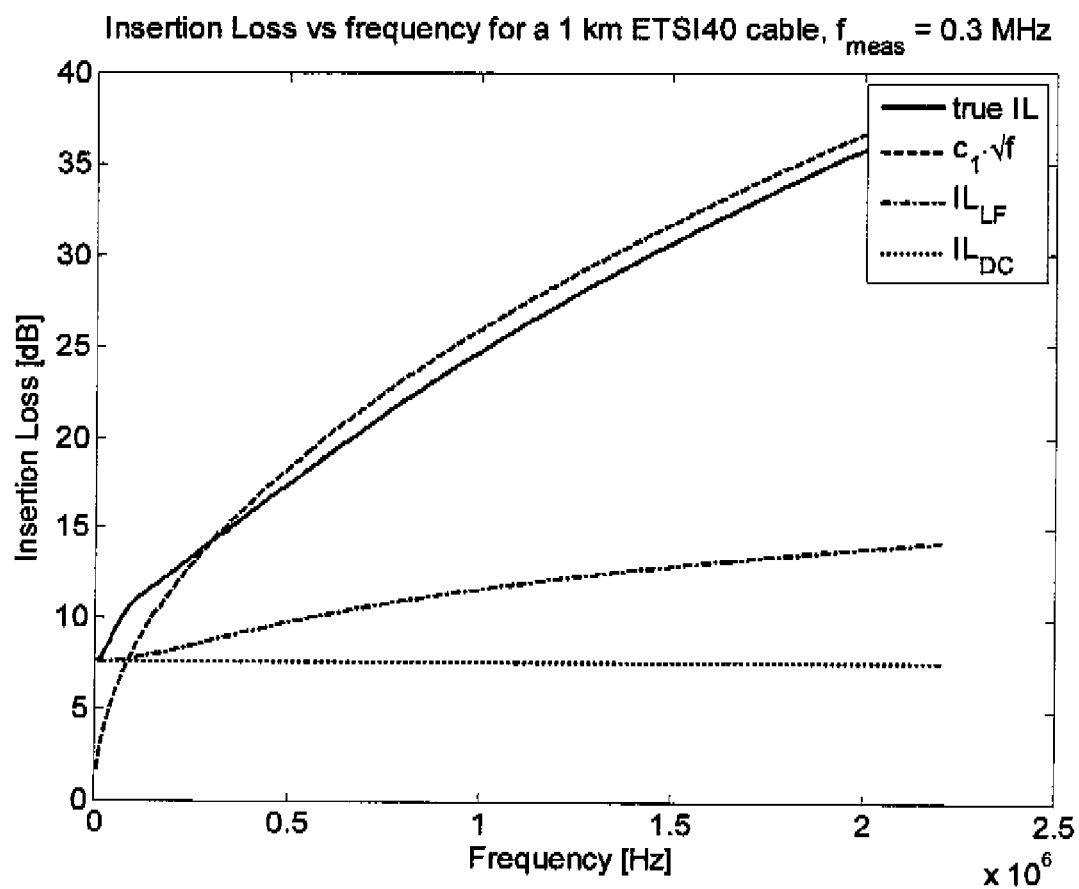
FIG. 5 is a diagram illustrating performance of a prior method compared to true insertion loss as calculated from the ETSI cable model.

FIG. 5 shows how well a prior art method performs in comparison with the true insertion loss as calculated from the ETSI cable model for a 0.4 mm PE-insulated cable. As can be seen, the prior art performs quite well from 300 kHz and up with only a small and almost constant offset of 1-2 dB. FIG. 5 illustrates the comparison of the true insertion loss (true IL) calculated from the ETSI model, a prior art method valid for high frequencies ($c1 \times \sqrt{f}$), and two low-frequency approximations (ILLF and ILDC).

Figure 6:
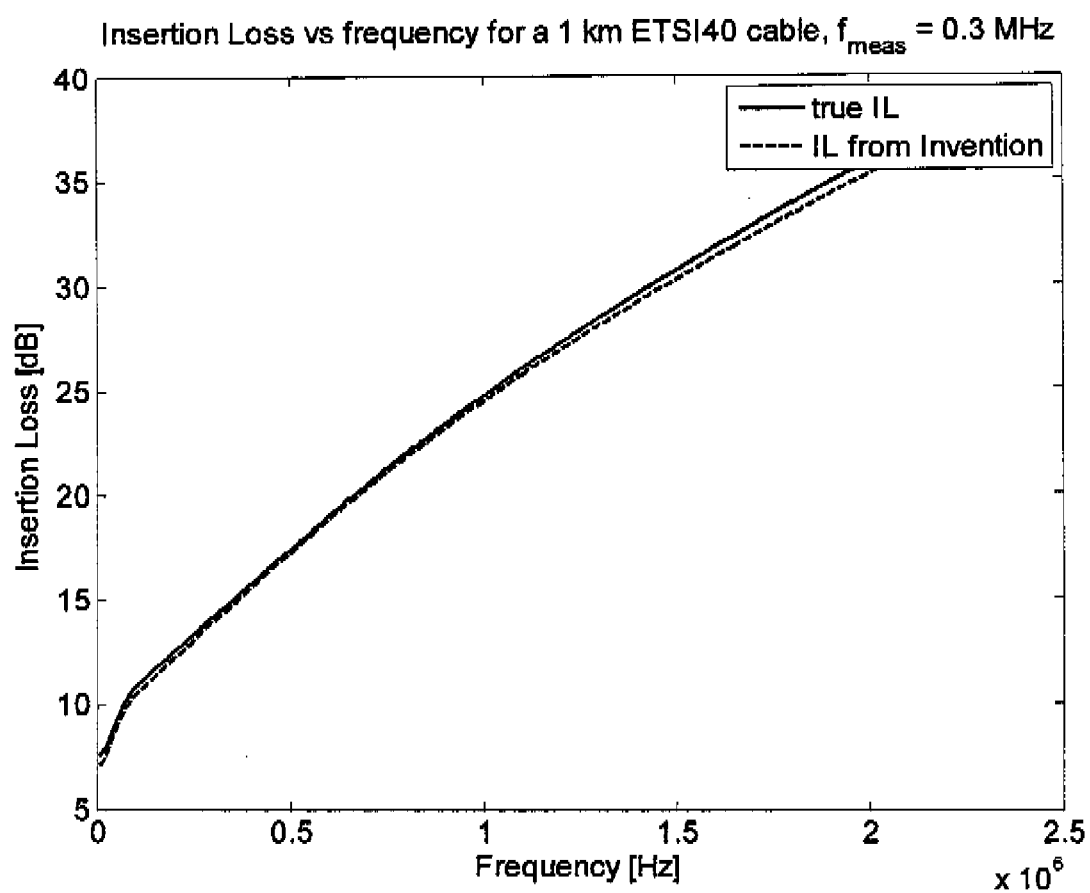
FIG. 6 is a diagram illustrating insertion loss for a cable model compared to insertion loss estimated in the present application.

FIG. 6 illustrates insertion loss for a cable model compared with insertion loss estimated in accordance with embodiments of the present invention wherein the primary (effective resistance, internal inductance, capacitance, and external inductance) and secondary (characteristic impedance and propagation constant) parameters are calculated when the loop length is known and both the insertion loss per km and the characteristic impedance are known at a single first frequency.

The invention claimed is:

1. A method in a telecommunication system comprising a digital subscriber line access multiplexer (DSLAM) or a server connected to the DSLAM, for estimating frequency dependent resistance of a transmission line, comprising the steps of:
    determining, by the DSLAM or the server, insertion loss per length unit of the transmission line at a first frequency,
    calculating, by the DSLAM or the server, a first resistance per length unit based on the determined insertion loss per length unit of the transmission line; and
    calculating, by the DSLAM or the server, effective resistance per length unit at a second frequency based on the calculated first resistance.

2. The method according to claim 1, further comprising the step of
    calculating, by the DSLAM or the server, an insertion loss per length unit at a second frequency based on the calculated effective resistance.

3. The method according to claim 2, wherein the transmission line is represented by a cable, the method comprising the additional step of:
    selecting, by the DSLAM or the server, a cable model from a set of predetermined cable models, which said cable model has a resistance per length unit which approximately corresponds to the calculated first resistance per length unit of the transmission line; and wherein the calculation of the insertion loss for the second frequency is further based on a known secondary parameter of the cable model.

4. The method according to claim 3, wherein the primary parameters are internal inductance per length unit, capacitance per length unit and external inductance per length unit.

5. The method according to claim 2 wherein the transmission line is represented by a cable, the method comprising the additional steps of:
    selecting, by the DSLAM or the server, a cable model from a set of predetermined cable models, which said cable model has a resistance per length unit which approximately corresponds to the calculated first resistance per length unit of the transmission line; and
    calculating, by the DSLAM or the server, a secondary parameter of the transmission line based on known primary parameters of the selected cable model, wherein the calculation of the insertion loss for the second frequency is further based on the calculated secondary parameter of the transmission line.

6. The method according to claim 1, wherein the calculated first resistance per length unit is the resistance of the transmission line at DC or at a frequency which is close enough to DC that the skin effect is not noticeable.

7. The method according to claim 1, wherein the effective resistance per length unit at the second frequency is calculated as $$R' = R'_0 \cdot \sqrt[4]{1 + \left(\frac{f}{f_0}\right)^2}$$

where $f_0$ is calculated based on $R'_0$ and $R'_0$ is the first resistance per length unit and f is the second frequency, and wherein $f_0$ is calculated as $$f_0 = \frac{2R'_0}{\mu\kappa^2}$$

where $\mu$ is the permeability of the conductor of the transmission line and $\kappa$ is the proximity factor of the conductor of the transmission line.

8. The method according to claim 1, wherein if the first frequency is higher than a threshold value the calculation of the first resistance is further based on the first frequency.

9. The method according to claim 8, wherein the threshold value is the cutoff frequency for the skin effect, such that for frequencies far below it the effective resistance is essentially constant and for frequencies far above it the effective resistance increases essentially as the square root of frequency.

10. The method according to claim 1, wherein if the first frequency is higher than a threshold value, the wire radius of the transmission line is estimated as $$\hat{r} = \frac{c_2\sqrt{f_\Phi}}{IL'_\Phi}$$

where $\hat{r}$ is the wire radius, $c_2$ is a constant, $f_\Phi$ is the first frequency and $IL'_\Phi$ is the insertion loss per length unit at the first frequency.

11. The method according to claim 10, wherein the constant $c_2$ is in the range $4.9 \cdot 10^{-3}$ to $5.2 \cdot 10^{-3}$ when the radius is measured in mm, frequency in Hz and insertion loss in dB/km.

12. The method according to claim 1, wherein if the first frequency is lower or equal than the threshold value the calculation of the first resistance per length unit is further based on at least one of the source impedance and the termination impedance.

13. The method according claim 1, wherein the calculation of the insertion loss is further based on the source impedance.

14. The method according to claim 1, further comprising the steps of:
    calculating, by the DSLAM or the serer, internal inductance per length unit and external inductance per length unit of the transmission line based on the calculated first resistance per length unit of the transmission line,
    determining, by the DSLAM or the server, a characteristic impedance at the first frequency or a third frequency and a velocity of propagation parameter associated with the transmission line,
    calculating, by the DSLAM or the server, capacitance per length unit of the transmission line based on the determined characteristic impedance and velocity of propagation parameter,
    calculating, by the DSLAM or the server, a secondary parameter of the transmission line based on the calculated effective resistance, internal inductance, external inductance and capacitance; and wherein the calculation of the insertion loss for the second frequency is further based on the calculated secondary parameter of the transmission line.

15. The method according to claim 14, wherein the calculation of the internal inductance and external inductance are further based on the characteristic impedance at the first frequency or the third frequency.

16. The method according to claim 14, wherein the calculation of the insertion loss is further based on the source impedance.

17. The method according to claim 14 wherein the secondary parameter is characteristic impedance per length unit or propagation constant per length unit.

18. The method according to claim 14, further comprising the steps of:
determining, by the DSLAM or the server, loop length of the transmission line; and
converting, by the DSLAM or the server, the primary and the secondary parameters per length unit to primary and secondary parameters describing the whole transmission line by multiplying the parameters per length unit with the loop length, wherein the calculated insertion loss at the second frequency describes the whole transmission line.

19. A telecommunication system configured to estimate frequency dependent resistance of a transmission line, the system comprising a digital subscriber line access multiplexer (DSLAM) or a server connected to the DSLAM, wherein the DSLAM or the server comprises:
a determining unit configured to determine insertion loss per length unit of the transmission line at a first frequency;
a calculating unit configured to calculate a first resistance per length unit based on the determined insertion loss per length unit of the transmission line; and
the calculating unit further configured to calculate effective resistance per length unit at a second frequency based on the calculated first resistance.

20. The telecommunication system according to claim 19, the calculating unit further configured to calculate an insertion loss per length unit at a second frequency based on the calculated effective resistance.

21. The telecommunication system according to claim 20, wherein if the first frequency is lower or equal than the threshold value the calculation of the first resistance per length unit is further based on at least one of the source impedance and the termination impedance.

22. The arrangement-telecommunication system according to claim 20, wherein the calculation of the insertion loss is further based on the source impedance.

23. The telecommunication system according to claim 20, wherein the DSLAM or the server further comprises:
a calculating unit configured to calculate internal inductance per length unit and external inductance per length unit of the transmission line based on the calculated first resistance per length unit of the transmission line;
a determining unit configured to determine characteristic impedance at the first frequency or a third frequency and a velocity of propagation parameter associated with the transmission line;
a calculating unit configured to calculate capacitance per length unit of the transmission line based on the determined characteristic impedance and velocity of propagation parameter; and
a calculating unit configured to calculate a secondary parameter of the transmission line based on the calculated effective resistance, internal inductance, external inductance and capacitance, wherein the calculation of the insertion loss for the second frequency is further based on the calculated secondary parameter of the transmission line.

24. The telecommunication system according to claim 23, wherein the calculation of the internal inductance and external inductance are further based on the characteristic impedance at the first frequency or the third frequency.

25. The telecommunication system according to claim 23, wherein the calculation of the insertion loss is further based on the source impedance.

26. The telecommunication system according to claim 23, wherein the secondary parameter is characteristic impedance per length unit or propagation constant per length unit.

27. The telecommunication system according to claim 23, wherein the DSLAM or the server further comprises:
a determining unit configured to determine loop length of the transmission line; and
a converting unit configured to convert the primary and the secondary parameters per length unit to primary and secondary parameters describing the whole transmission line by multiplying the parameters per length unit with the loop length, wherein the calculated insertion loss at the second frequency describes the whole transmission line.

28. The telecommunication system according to claim 20, wherein the transmission line is represented by a cable, wherein the DSLAM or the server further comprises:
a selecting unit configured to select a cable model from a set of predetermined cable models, which said cable model has a resistance per length unit which approximately corresponds to the calculated first resistance per length unit of the transmission line; and
a calculating unit configured to calculate a secondary parameter of the transmission line based on known primary parameters of the selected cable model, wherein the calculation of the insertion loss for the second frequency is further based on the calculated secondary parameter of the transmission line.

29. The telecommunication system according to claim 28, wherein the primary parameters are internal inductance per length unit, capacitance per length unit and external inductance per length unit.

30. The telecommunication system according to claim 20, wherein the transmission line is represented by a cable, wherein the DSLAM or the server further comprises:
a selecting unit configured to select a cable model from a set of predetermined cable models, which said cable model has a resistance per length unit which approximately corresponds to the calculated first resistance per length unit of the transmission line, and wherein the calculation of the insertion loss for the second frequency is further based on a known secondary parameter of the cable model.

31. The telecommunication system according to claim 19, wherein the calculated first resistance per length unit is the resistance of the transmission line at DC or at a frequency which is close enough to DC that the skin effect is not noticeable.

32. The telecommunication system according to claim 19, wherein the effective resistance per length unit at the second frequency is calculated as $$R' = R'_0 \cdot \sqrt[4]{1 + \left(\frac{f}{f_0}\right)^2}$$

where $f_0$ is calculated based on $R'_0$ and $R'_0$ is the first resistance per length unit and f is the second frequency, and wherein $f_0$ is calculated as $$f_0 = \frac{2R'_0}{\mu \kappa^2}$$

where $\mu$ is the permeability of the conductor of the transmission line and $\kappa$ is the proximity factor of the conductor of the transmission line.

33. The telecommunication system according to claim 19, wherein if the first frequency is higher than a threshold value the calculation of the first resistance is further based on the first frequency.

34. The telecommunication system according to claim 33, wherein the threshold value is the cutoff frequency for the skin effect, such that for frequencies far below it the effective resistance is essentially constant and for frequencies far above it the effective resistance increases essentially as the square root of frequency.

35. The telecommunication system according to claim 19, wherein if the first frequency is higher than a threshold value, the wire radius of the transmission line is estimated as $$\hat{r} = \frac{c_2 \sqrt{f_\Phi}}{IL'_\Phi}$$

where $\hat{r}$ is the wire radius, $c_2$ is a constant, $f_\Phi$ is the first frequency and $IL'_\Phi$ is the insertion loss per length unit at the first frequency.

36. The telecommunication system according to claim 35, wherein the constant $c_2$ is in the range $4.9 \cdot 10^{-3}$ to $5.2 \cdot 10^{-3}$ when the radius is measured in mm, frequency in Hz and insertion loss in dB/km.

* * * * *

UNITED STATES PATENT AND TRADEMARK OFFICE
CERTIFICATE OF CORRECTION

PATENT NO. : 9,054,785 B2
APPLICATION NO. : 13/504261
DATED : June 9, 2015
INVENTOR(S) : Berg et al.

It is certified that error appears in the above-identified patent and that said Letters Patent is hereby corrected as shown below:

In the Specification

In Column 5, Line 60, delete "clue to" and insert -- due to --, therefor.

In Column 6, Line 43, delete "constant F" and insert -- constant $\Gamma$ --, therefor.

In Column 6, Line 48, in Equation (3), delete " $\Gamma = \alpha + j\beta = \sqrt{(R + k\omega L)(G + j\omega C)}$ " and insert -- $\Gamma = \alpha + j\beta = \sqrt{(R + j\omega L)(G + j\omega C)}$ --, therefor.

In Column 7, Lines 5-11, delete "
$$\begin{cases} \alpha = \sqrt{\frac{\omega^2 LC}{2} \cdot \left(\sqrt{1 + \left(\frac{R}{\omega L}\right)^2} - 1\right)} \\ \beta = \sqrt{\frac{\omega^2 LC}{2} \cdot \left(\sqrt{1 + \left(\frac{R}{\omega L}\right)^2} + 1\right)} \end{cases}$$
" and insert --
$$\begin{cases} \alpha = \sqrt{\frac{\omega^2 LC}{2} \cdot \left(\sqrt{1 + \left(\frac{R}{\omega L}\right)^2} - 1\right)} \\ \beta = \sqrt{\frac{\omega^2 LC}{2} \cdot \left(\sqrt{1 + \left(\frac{R}{\omega L}\right)^2} + 1\right)} \end{cases}$$
--, therefor.

In Column 11, Line 36, delete "since a" and insert -- since $\alpha$ --, therefor.

In Column 11, Line 39, delete "$R_0 \ll Zs+Z_t$" and insert -- $R_0 \ll Z_s + Z_t$, --, therefor.

Signed and Sealed this
Eighth Day of March, 2016

Michelle K. Lee
*Director of the United States Patent and Trademark Office*

CERTIFICATE OF CORRECTION (continued)
U.S. Pat. No. 9,054,785 B2

In Column 12, Line 56, in Equation (23), delete "$IL_{HF,1} \approx c_1 \sqrt{f}$" and insert -- $IL_{HF,1} \approx c_1 \sqrt{f}$ --, therefor.

In Column 13, Line 61, delete "Where" and insert -- where --, therefor.

In Column 15, Line 22, delete "unit R" and insert -- unit $R'$. --, therefor.

In Column 15, Line 35, delete "$IL_f \approx c_1 \sqrt{f}$" and insert -- $IL_f \approx c_1 \sqrt{f}$ --, therefor.

In Column 15, Line 50, delete "unit" and insert -- unit $L'_{ext}$ --, therefor.

In Column 16, Line 36, delete "$\Gamma = \alpha + j\beta = \sqrt{(R' + j\omega L')(G + j\omega C')}$" and insert -- $\Gamma = \alpha + j\beta = \sqrt{(R' + j\omega L')(G + j\omega C')}$ --, therefor.

In the Claims

In Column 19, Line 28, in Claim 2, delete "step of" and insert -- step of: --, therefor.

In Column 20, Line 48, in Claim 13, delete "according" and insert -- according to --, therefor.

In Column 20, Line 52, in Claim 14, delete "the serer," and insert -- the server, --, therefor.

In Column 21, Line 48, in Claim 22, delete "arrangement-telecommunication" and insert -- telecommunication system --, therefor.